US006238755B1

(12) United States Patent
Harvey et al.

(10) Patent No.: US 6,238,755 B1
(45) Date of Patent: May 29, 2001

(54) INSULATING GLASS UNITS

(75) Inventors: Martin Harvey, Waterloo (BE); Karl-Heinz Rueckeshaeuser, Bad Schwalbach (DE); Jean-Paul Hautekeer, Verlaine; Andreas Wolf, Braine-l'Alleud, both of (BE)

(73) Assignees: Dow Corning Corporation, Midland, MI (US); Dow Corning GmbH, Wiesbaden (DE); Dow Corning, S.A., Barry (GB)

( * ) Notice: Subject to any disclaimer, the term of this patent is extended or adjusted under 35 U.S.C. 154(b) by 0 days.

(21) Appl. No.: 09/191,707

(22) Filed: Nov. 13, 1998

(30) Foreign Application Priority Data

Nov. 15, 1997 (GB) .................................................. 9724077

(51) Int. Cl.[7] .............................. E06B 3/24; C03C 27/00; E04C 2/54

(52) U.S. Cl. .......................... 428/34; 52/786.13; 156/109

(58) Field of Search ..................... 428/34, 192; 156/1–7, 156/109; 52/786.1, 786.13

(56) References Cited

U.S. PATENT DOCUMENTS

| | | | |
|---|---|---|---|
| 3,733,237 | 5/1973 | Wolff | 156/468 |
| 3,832,254 | 8/1974 | Bowser et al. | 156/107 |
| 4,186,685 | 2/1980 | Chenel et al. | 118/410 |
| 4,205,104 | 5/1980 | Chenel | 428/34 |
| 4,226,063 | 10/1980 | Chenel | 52/172 |
| 4,429,509 | 2/1984 | Vachet et al. | 52/788 |
| 4,561,929 | 12/1985 | Lenhardt | 156/522 |
| 4,614,676 | 9/1986 | Rehfeld | 428/34 |
| 4,708,762 | 11/1987 | Lenhardt | 156/556 |
| 4,831,799 | 5/1989 | Glover et al. | 52/172 |
| 4,951,927 * | 8/1990 | Johnston et al. | 264/129 |
| 5,531,047 | 7/1996 | Leopold et al. | 52/172 |
| 5,564,631 | 10/1996 | Leopold | 239/135 |
| 5,601,677 | 2/1997 | Leopold | 156/109 |
| 5,775,393 | 7/1998 | Kovacik | 141/383 |

FOREIGN PATENT DOCUMENTS

| | | | |
|---|---|---|---|
| 19533855 | 4/1997 | (DE) | E06B/3/673 |
| 261923 | 9/1987 | (EP) | E06B/3/66 |
| 283971 | 9/1988 | (EP) | E06B/3/66 |
| 841825 | 7/1960 | (GB) . | |
| 957255 | 5/1964 | (GB) . | |
| 962061 | 6/1964 | (GB) . | |
| 1078214 | 8/1967 | (GB) | C07F/7/10 |
| 1175794 | 12/1969 | (GB) | C07F/7/10 |
| 2228519 | 8/1990 | (GB) | E06B/3/66 |
| 2293618 | 4/1996 | (GB) | E06B/3/66 |

* cited by examiner

*Primary Examiner*—Donald J. Loney
(74) *Attorney, Agent, or Firm*—Patricia M. Scaduto

(57) ABSTRACT

The specification describes and claims an insulating glass unit and a process for making. The unit comprises two glass panes spaced apart by a spacer of thermoplastics material adherent to the panes, an inert or heavy gas trapped within the unit and a layer of silicone elastomer located at the periphery of the unit between edge portions of the glass panes and in contact with external surfaces of the spacer. The thermoplastics material has a water vapor permeability of not more than about 0.2 $l/m^2/day$ (measured at 20° C. for 4 mm thickness) and a shear strength of more than 0.2 MPa as determined at a sealant thickness of 0.5 mm at 23° C. and a shear speed of 100 mm/min. The process described for making these units comprises providing between two glass panes an endless strip of the thermoplastics material in a plastic state applied as a hot melt containing a dehydrating material, urging the two glass panes towards each other against the thermoplastics material to form a spacer comprising the thermoplastics material adherent to the panes, introducing to the cavity defined by the two panes and the spacer an inert or heavy gas and applying a layer of silicone elastomer located at the periphery of the unit in contact with external surfaces of the spacer.

14 Claims, 1 Drawing Sheet

INSULATING GLASS UNITS

Figure 1:
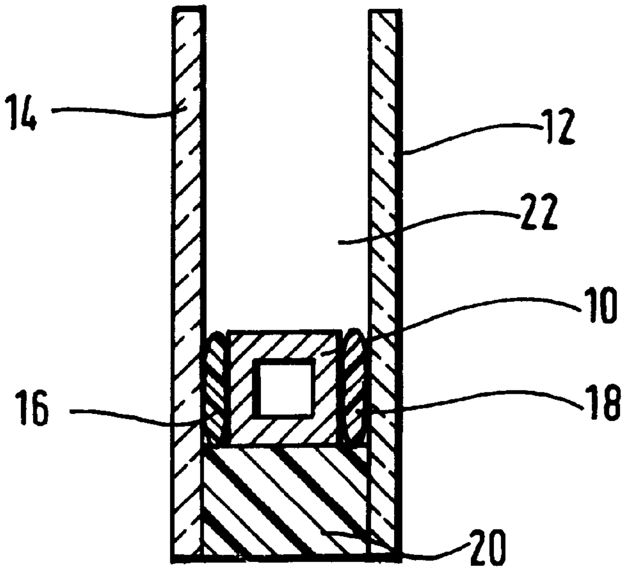

This invention is concerned with improvements in or relating to insulating glass units.

It has been a practice for many years to form insulating glass units consisting of two, three, or more glass panes which are spaced apart by a spacing and sealing assembly (generally referred to as "edge seal") extending around the periphery of the inner facing surfaces of the glass panes to define a substantially hermetically sealed insulating space between the glass panes. It is a common practice to employ a metal preformed spacer to hold the glass panes separated and to assure the required rigidity of the unit. The preformed spacer may also contain a desiccant in such a way as to enable the desiccant to maintain air or other gas within the unit in a dry condition after the manufacture of the unit. The preformed spacer can be manufactured from metals by various machining processes. In one typical form of insulating glass unit construction, the edge seal comprises a hollow metal spacer element adhered to the inner facing surfaces of the glass panes by a low gas and moisture permeable sealant to provide a primary hermetic seal. The hollow spacer element is filled with a desiccant material, which is put in communication with the insulating space between the glass panes to absorb moisture therefrom in order to improve the performance and durability of the insulating glass unit. It is also a common practice to employ a so-called butyl sealant which is a polyisobutylene rubber based composition as primary sealant to bond the metal spacer to the glass panes and to employ a secondary sealant bonded to the panes around the spacer. This so-called "dual seal" system provides a better longevity of the insulating glass unit than the so-called "single seal" system, in which only a single sealant is employed. Various materials have been used to provide the secondary sealant, including for example polysulphides, polyurethanes and silicones. It has also become a practice to include within the unit a gas other than air, for example an inert gas such as Argon, Xenon, Krypton or $SF_6$ to improve the level of thermal or acoustic performances required. In a glazing unit as described, the butyl sealant ensures satisfactory adhesion of the metal spacer to the glass panes so as to provide desired moisture vapour or gas impermeability to the unit, thus avoiding moisture vapour entering and condensing in the cavity of the unit and, in case of a gas filled unit avoiding escape of gas from the unit. The secondary sealant serves to promote the integrity of the bond of the butyl rubber based composition by minimising the strain imposed on it due to external factors such as fluctuations in ambient temperature, barometric pressure, or wind pressure.

Whilst it is the common practice to employ hollow metal and preferably aluminium spacers there have been proposals to employ preformed spacers made from other materials for example butyl spacers (which may contain an undulated aluminum foil) or silicone or organic rubber foam spacers.

In U.S. Pat. No. 4,226,063 there is described a multiple pane window having an inner filamentary seal and an outer seal. The inner seal contains desiccant material whose concentration is greater in the inner portion thereof than in the outer portion thereof. In this arrangement the inner filamentary seal comprises a polyisobutylene based formulation and the outer seal is provided by a mastic, generally a polysulphide or silicone based mastic. The outer seal is responsible for the mechanical stability of the window.

In GB patent specification 2228519 there is described a multiple glazing panel for a vehicle comprising at least two panes of glass and a sealing spacer in which the sealing spacer comprises a flexible and malleable first element in contact with both panes and providing a barrier to entry of humidity into the sealed space in the unit and a second element in contact with both panes and being at least partially formed of an adhesive having a modulus of elasticity greater than 1.4 MPa. The first element is preferably butyl rubber and the second element may be based on silicone or polysulphide but is preferably provided by a polyurethane.

Interest in glazing units is primarily due to their thermal transmission coefficient properties or their acoustic properties. Thermal transfer by conduction or convection can be decreased by substituting the air present in the cavity of the insulating glass unit with a heavy rare gas having a lower thermal conductivity. Transfer by radiation can be decreased using low-emissivity (low E) glass. Typically, the thermal coefficient (the so-called "K-value", which is a measure of the flux of heat energy through an area of 1 $m^2$ in the centre of the insulating glass unit for a temperature difference of 1° K. between the interior and exterior) for high performance insulating glass units filled with gas is below 1.5 and can be as low as 1.2, some combinations of low E coatings and special gases allowing K-values below 1.0 $W/m^2/K$ (i.e. Watts per square meter per degree Kelvin). For acoustic performance, beside the use of glass pane elements with different thickness in combination with laminated glass, a better acoustic performance can also be achieved by replacing a part or all of the air or rare gas present in the cavity by $SF_6$ gas.

Although desirably low K-values can be obtained with special gas filling and low E-coatings in the center of the insulating glass unit, the use of conventional edge seal systems, containing a metal spacer, results in higher thermal conductivity at the perimeter of the insulating glass unit. The higher conductivity of the edge seal causes water condensation to occur on the interior glass surface under certain environmental conditions and is therefore undesirable. Several technical solutions have been proposed regarding edge seals with reduced thermal conductivity (so-called "warm edge" systems).

There is a need to provide high performance glazing units in applications such as structural glazing or certain types of roof glazing where the entire or part of the seal system of the unit is directly exposed to sunlight (which contains damaging UV radiation). In such applications, the sealant is not only required to contribute to the integrity of the seal system of the unit itself against barometric pressure variation inside the cavity but also to contribute to the transfer of the wind load or deadload on the structure of the building. Furthermore, the glass adhesion of the sealant in such applications has to have excellent resistance against the damaging influences of sunlight (UV radiation) and the other weathering elements (especially heat and water). Organic sealants, such as those based on polyurethane, polysulfide, polybutadiene, etc., do not have a sufficiently UV resistant glass adhesion to allow their use for sealed units for these applications. Silicone sealants are currently the only known sealant type to have sufficiently stable glass adhesion and are the only materials approved for structural glazing application in the various national specification standards, practices, and building codes. Silicone sealants, however, have much higher gas permeabilities than organic sealants. Insulating glass units filled with special gases (such as argon) and having a dual edge seal design with butyl rubber primary sealant and silicone as secondary sealant display a high gas loss rate and do not pass national requirement standards for gas filled insulating glass units, such as DIN 1286, part 2. Thus, the manufacturer of insulating glass units today faces the following dilemma: Units that are sealed with organic sealants (such as the ones stated above) may comply with the national requirement standards for gas filled insulating glass units, but do not comply with the requirements for structural glazing and cannot be used for this and other applications involving a direct exposure of the edge seal to sunlight. On the other hand, units that are sealed with suitable silicone glazing sealants may comply with the requirements for structural glazing and can be used in applications involving a freely exposed edge seal, but do not satisfy the requirements for gas filled insulating glass units.

The method to assess the performance criteria for a gas filled unit includes the measurement of the initial gas concentration that needs to be above a minimum value to reach the desired K value and the measurements of the gas loss rate expressed in terms of % per annum to assess if the gas loss of the unit during an economically reasonable life will affect significantly the heat transmission coefficient. Said method is described in the DIN 1286 part 2 standard. There are several methods for assessing whether a secondary sealant is suitable for use in insulating glass units which will be used in an environment where direct exposure to sunlight (UV radiation) is anticipated. For example ASTM C-1184 (Standard Specification for Structural Silicone Sealants), refers to a cyclic exposure of five test specimens to a combination of UV light, humidity, and heat for a total of 5000 hours. The exposure is carried out in an accelerated weathering machine (conforming to ASTM Practice G53) with a weathering cycle of 4 hours of UV light exposure (using UVA-340 lamps) at 60° C., followed by 4 hours of condensation at 40° C. In the test, the bond surface of the sealant to the glass substrate is facing the UV source. The tensile strength of the test specimen is monitored before and after aging and has to exceed 0.345 MPa at the completion of the test. A sealant which exhibits no significant change in its stress/strain behaviour is regarded as UV stable.

There are no economically viable insulating glass units currently available that can pass successfully both types of industry standard tests.

Recently it has been proposed to employ thermoplastic materials to provide the spacer between the periphery of the panes in insulating glass units. For example, there is described and claimed in patent specification WO 95/11364 a process and apparatus for production of an insulating glass unit comprising a spacer between two glass panes involving (i) extruding a plastic material forming the frame onto a support to which it has low adhesion, (ii) transferring the frame from the support onto the edges of a second glass plate prior to aligning a first glass plate and pressing them together. In order to form the frame, a thermoplastic or thermosetting plastic is extruded from a nozzle onto a tilting table with low adhesion to the plastic extrudate. This process permits assembly of insulating glass units immediately after extruding the distance spacer.

Patent specification EP 213 513 discloses manufacture of a glass panel by joining two glass panes together around their edges with an insulating gap between their facing surfaces. The glass panes are joined by injecting a paste between them around the edges while the panes are held parallel to one another at a given distance apart. The paste is injected to form a strip of material which is initially paste like and subsequently hardens and adheres to the two panes of glass to its whole extent along the edge of the panes in the space between them.

Despite the various practices and proposals in the art, there remains a need to provide insulating glass having very low heat transmission coefficient, in order to decrease the coefficient of the entire windows and bring a positive energy balance to the unit, in conjunction with a highly durable warm edge seal system that can be exposed to sunlight in applications such as structural glazing or roof glazing, resulting in a prolonged unit performance. Currently, the attempts to achieve suitable thermal transfer across a glazing unit are confined to use of selected gases and low E coatings within the unit as aforesaid. In conjunction with units formed by use of a thermoplastic spacer as aforesaid instead of the traditional metal spacer, improved thermal transfer properties can be achieved at the periphery of the unit ("warm edge"), but there remains a need to provide a glazing unit which satisfies test standards of the industry for thermal transfer (which is determined by the initial gas concentration) coupled with satisfactory efficiency, as determined by gas loss per annum, and excellent durability of the edge seal under exposed conditions, as determined by the ASTM 1184 specification.

Among objects of the invention are to provide an improved insulating glass unit which employs a "warm edge seal" system that provides for example improved retention of contained special fill gases in insulating glass units and which may be used for example, for applications, in which the edge seal is directly exposed to sunlight, such as structural glazing or certain types of roof glazing.

Surprisingly we have now found that an insulating glass unit consisting of two glass panes, a spacer of thermoplastic material and a silicone sealant composition located at the periphery of the panes adjacent to an external surface of the frame and containing an inert gas for example a noble gas such as argon, krypton or xenon or a heavy gas such as $SF_6$ has a surprising combination of properties.

The present invention provides in one of its aspects an insulating glass unit comprising two glass panes spaced apart by a spacer of thermoplastics material adherent to the panes, an inert or heavy gas trapped within the unit and a layer of silicone elastomer located at the periphery of the unit between edge portions of the glass panes and in contact with external surfaces of the spacer, in which the spacer of thermoplastics material has been formed in place by hot application and has a water vapour permeability of not more than about 0.2 $1/m^2$/day (measured at 20° C. for 4 mm thickness) a shear strength of more than 0.2 MPa as determined at a sealant thickness of 0.5 mm at 23° C. and a shear speed of 100 mm/min.

The present invention also extends to a method of making units as set forth in the preceding paragraph.

In an insulating glass unit according to the invention, it is essential that the silicone elastomer forms the outer (secondary) seal and the thermoplastic material provides both the spacing element and the inner (primary) seal. It is believed that an inverted configuration, where the thermoplastic material, and for that matter, any organic sealant, were used as the outer seal and the silicone were used as the inner seal, would fail prematurely, due to the lack of long-term stable glass adhesion of the organic sealant, when exposed freely to the elements (including the damaging UV rays), if not protected by an outer silicone sealant. Once the organic sealant were to lose its adhesion, any inner silicone seal would not provide a sufficient moisture vapor and gas barrier and the unit would fail prematurely.

In an insulating glass unit according to the present invention, the thermoplastic material from which the spacer element is formed may be, for example, a thermoplastic material based on polyisobutylene, which may contain desiccant. Suitable materials are those which can be extruded as a hot melt, and cool to a solid mass adherent to the glass. If desired, the material may undergo a measure of curing after application as a hot melt. One suitable material is commercially available under the trade name "Naftotherm—Bu TPS" from Chemetal GmbH which is said to be a single component, thermoplastic solvent free composition based on polyisobutylene, which contains a zeolite powder desiccant, has a density of 1.25g/cm and offers a shear strength of 0.4 MPa at a thickness of 0.5 mm at 23° C. (shear speed 100 mm/min).

In a glazing unit according to the present invention, the silicone material employed to provide the seal around the edge of the glass panes may be selected from the known silicone glazing sealant compositions and may be, for example, a curable siloxane composition which has the ability to cure to an elastomer at normal ambient or slightly elevated temperatures either spontaneously upon mixing the components or as a result of exposure to moisture to provide an elastomer mass adherent to glass. Any of these materials may be used provided it is compatible with the spacer and does not derogate from the integrity of the unit and has adequate adhesive properties. These materials may be formulated to have excellent adhesion to glass as well as modulus and elongation characteristics which are particularly appropriate for use as sealants for glazing units.

Materials which may be used to provide the silicone elastomer are typically those which have a viscosity in the range 150 to 100,000 $mm^2/s$ at 25° C. and which cure to provide elastomers of appropriate adhesive, cohesive and modulus properties. Typically these materials employ polydiorganosiloxanes in which the organic substituents attached to the silicon atoms are selected from alkyl groups having from 1 to 10 carbon atoms, for example methyl, propyl, hexyl and decyl, alkenyl groups having from 2 to 8 carbon atoms, for example vinyl, allyl and hexenyl, and aryl, alkaryl and aralkyl groups having from 6 to 8 carbon atoms, for example phenyl, tolyl and phenylethyl. At least 30 percent of the total substituents should be methyl. Preferred from an economic stand point are polydiorganosiloxanes in which substantially all of the silicon-bonded substituents are methyl. However, it has been found that the presence of larger substituents such as phenyl may contribute to a reduction in permeability. Typically these compositions contain polydiorganosiloxanes with silicon-bonded reactive groups by means of which the desired room temperature curing can be effected. Such groups may be, for example, hydroxyl, alkoxy, oximo or acyloxy and are normally attached to terminal silicon atoms of a polydiorganosiloxane.

In general the silicone compositions employ a curing agent which is effective in converting the polydiorganosiloxane to the solid elastic state at normal ambient or slightly elevated temperatures, usually about 15 to 30° C. The polydiorganosiloxane and curing agent may be selected to provide a room temperature vulcanising system. A variety of compositions based on such systems are well-known in the art and any of these can be employed as the basis of the compositions of the present invention. Examples of such compositions are:

(i) vulcanisable organosiloxane compositions based on an organosiloxane polymer having in the molecule silicon-bonded oxime radicals, and/or a mixture of an organosiloxane polymer having silanol groups and a silane having at least 3 silicon-bonded oxime groups. Such compositions are described for example in UK patents 975 603 and 990 107;

(ii) vulcanisable organosiloxane compositions based on an organosiloxane polymer having terminal silicon-bonded acyloxy groups, and/or a mixture of silanol-terminated organosiloxane polymer and a silane having at least 3 silicon-bonded acyloxy groups per molecule. Such compositions are described for example in UK Patents 862 576, 894 758 and 920 036;

(iii) vulcanisable compositions based on an organosiloxane polymer having terminal silicon-bonded amide or amino groups, and/or a mixture of silanol-terminated organosiloxane polymer and a silylamine or silylamide. Such vulcanisable compositions are described for example in UK Patents 1 078 214 and 1 175 794, and (iv) vulcanisable organosiloxane compositions based on an organosiloxane polymer having in the molecule silicon-bonded alkoxy groups, and/or a mixture of an organosiloxane polymer having silanol groups with a silane having alkoxy groups or a partial hydrolysis product of said silane, for example ethyl polysilicate. Compositions of this type are described in UK Patents 957 255, 962 061 and 841 825.

The above one-part silicone compositions may also be used in combination with a second part ("accelerator paste") containing, for instance, in the case of the acidic cure system basic materials, such as CaO, MgO, $Al_2O_3/Al(OH)_3$, etc., resulting in an acceleration of the cure.

The silicone composition may also comprise a catalyst such as an organo metal compound, for example stannous octoate, dibutyltin dilaurate or a titanium chelate.

Preferred compositions also comprise an adhesion promoter effective to enhance adhesion to glass. Preferred adhesion promoters are multifunctional materials such as those obtained by reacting (in situ or by a preliminary step) (i) alkylalkoxysilicone, (ii) aminoalkoxysilane, (iii) an epoxyalkoxysilane.

As alkylalkoxysilicone there may be employed certain silicon compounds, or mixtures thereof, having in the molecule at least three silicon-bonded alkoxy or alkoxyalkoxy groups. The silicon compound may be a silane or a siloxane. Illustrative of such silicon compounds are alkyl orthosilicates e.g. ethyl orthosilicate and propyl orthosilicate, alkyl polysilicates e.g. ethyl polysilicate and n-propyl polysilicate, monoorganotrialkoxysilanes e.g. methyl trimethoxysilane, ethyl trimethoxysilane, methyl tri n-propoxysilane, butyl triethoxysilane and phenyl trimethoxysilane. Preferred materials are alkyltrialkoxysilanes. As aminoalkoxysilane, one may employ one or more materials of the formula $RHNR'SiX_a(OY)_{3-a}$ having in the molecule silicon-bonded hydrocarbonoxy groups and a silicon-bonded hydrocarbon group (preferably having no more than 12 carbon atoms) containing at least one amino group. In the general formula of the silanes the substituent R may be hydrogen, lower alkyl or an aliphatic group containing at least one amino group. R may therefore represent for example H, methyl, ethyl, propyl, the group—$(CH_2CH_2NH)_zH$ wherein z is an integer, preferably 1 or 2, or the group $H_2NQ$—wherein Q is a divalent hydrocarbon group e.g. $—CH(CH_3)CH_2—$, $—(CH_2)_4—$ or $—(CH_2)_5—$. The substituent Y may be for example, methyl, ethyl or methoxyethyl. a is an integer and has a value or 0 or 1, R' represents an alkylene group having from 3 to 6 inclusive carbon atoms, X represents a monovalent hydrocarbon group having from 1 to 6 inclusive carbon atoms. Preferred aminoalkoxysilane of the above formula are compounds represented by the formulae $$H_2N(CH_2)_2NHR'Si(OY)_3 \text{ and } H_2NR'Si(OY)_3$$

wherein R' represents an alkylene group having 3 or 4 carbon atoms e.g. $—(CH_2)_3—$ or $CH_2CH(CH_3)CH_2—$ and each Y represents methyl, ethyl or methoxyethyl. A preferred material is K-aminopropyltriethoxysilane. As epoxyalkoxysilane one may employ one or more silanes having hydrocarbonoxy groups and an epoxy containing organic group. A preferred material is glycidoxypropyl trimethoxysilane. Preferably these silanes are reacted in a molar ratio of (i):(ii):(iii) in the range 0.1 to 6:0.1 to 5:1.

Preferably the composition contains 0.1 to 15%, preferably 0.3 to 7%, more preferably 0.5 to 5% more preferably 2 to 5% by weight of the preferred adhesion promoter.

Although the silicone compositions used in this invention may utilise any room temperature curing reaction the preferred compositions are those of the so-called two-part type, for example those described under (iv) above which comprise a mixture of a polydiorganosiloxane having terminal silanol (≡SiOH) groups, an alkoxy silane or siloxane, for example methyltrimethoxysilane, ethylpolysilicate or n-propyl polysilicate and a metal salt of carboxylic acid, for example stannous octoate, dibutyltin dilaurate or dioctyltin dilaurate or a dimethyl tin carboxylate and an adhesion promoter. As is well known such compositions are normally prepared and stored as two packages, the packages being mixed at the point of use.

The silicone compositions generally contain at least 5 parts by weight of a reinforcing and/or an extending filler. Examples of such fillers include fume silica, precipitated silica, crushed quartz, aluminium oxide, calcium carbonates, which may be of the ground or precipitated types, mica, microballoons and clays. The fillers, particularly those such as the reinforcing silicas and calcium carbonate may be treated, for example by coating with organosilicon compounds or calcium stearate.

In addition, these silicone compositions may comprise plasticisers such as triorganosilyl endstopped polydimethylsiloxanes, pigments such as titanium dioxide, carbon black and iron oxide, and low molecular weight polydiorganosiloxanes as in situ filler treatments or for modifying the elastomeric modulus.

Preparation of the compositions can be effected by known mixing techniques.

In an insulating glass unit according to the invention, the gas trapped within the unit preferably comprises or consists of $SF_6$ or an inert gas such as Argon, Xenon, Krypton to improve the level of thermal or acoustic performances achieved. In order to ensure sufficient thermal or acoustic insulation properties, we prefer to ensure that at least 90% of the gas trapped within the unit is Argon, Xenon, Krypton or $SF_6$or mixtures thereof.

A glazing unit according to the invention may be constructed in any convenient way. In one method, the thermoplastic material containing desiccant is heated and applied as a hot paste at a temperature in the range of about 120° C. to about 160° C. to the periphery of a cleaned glass pane to form an endless "tape" adjacent to but spaced from the extreme edge of the pane. Whilst the tape is still hot, another cleaned glass pane is pressed against it. Gas is introduced into the cavity of the unit at a slight over pressure and the panes are pressed together to squeeze the paste into a desired shape having a thickness from about 7 mm to about 10 mm measured in a direction parallel to the plane of the glass pane and continuous contact with each glass pane over an area at least about 6 mm wide around the entire pane, i.e. measured in a direction normal to the plane of the glass pane. The unit is allowed to cool to room temperature and the plastics material hardens to provide the spacer bonded to both panes. Before or after the cooling has been completed a layer of the curable silicone composition is extruded into the "U" shaped space defined by the spacer and peripheral portions of the glass panes and allowed to cure to form a seal around the edge of the unit on top of the spacer and adherent to the panes of glass. The layer of silicone sealant has a minimum average thickness of 3 mm measured in a direction parallel to the plane of the glass pane and is in continuous contact with each glass pane. Depending on the type of application of the insulating glass unit, a greater thickness of the silicone sealant may be required. For instance, if the insulating glass unit is to be used in a structural glazing application, the thickness of the silicone sealant needs to be dimensioned in accordance with national standards and practices or building codes for the use of insulating glass units in structural glazing applications, such as ASTM C 1249 ("Standard Guide for Secondary Seal for Sealed Insulating Glass Units for Structural Sealant Glazing Applications").

An insulating glass unit according to the invention can be prepared which satisfies both the thermal requirement (in terms of heat transmission coefficient) and durability and are structurally stable, UV stable and demonstrate a gas leakage rate of less than 1% per year.

The following Examples, in which the parts and percentages are expressed by weight, illustrate the invention. Viscosity measurements are at 25° C. Examples are to be read with the accompanying drawings in which FIG. 1 is a diagrammatic section view through a comparative insulating glass unit and FIG. 2 is a diagrammatic section of an insulating glass unit illustrative of the invention.

Figure 2:
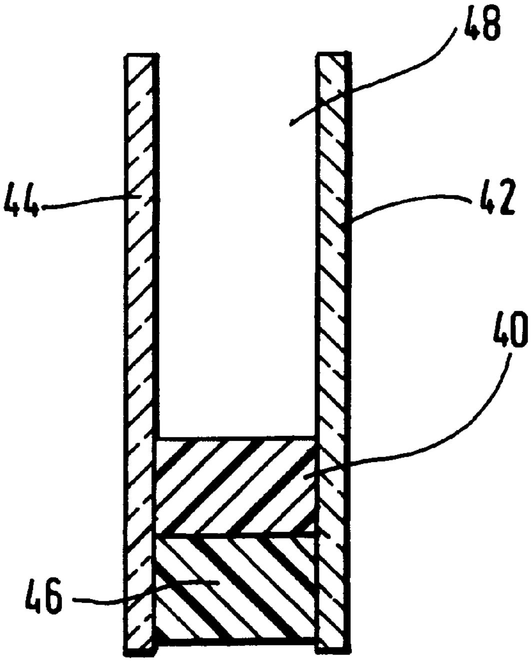

The comparative insulating glass unit shown in FIG. 1 was made by procuring a rectangular frame (10) of uniform section formed from hollow, square section aluminium tube, which was manufactured by bending all four corners on special bending equipment and joining the spacer frame along one of the longer sections by use of a metal connection (not shown). The frame was perforated on the side to be directed to the interior of the unit and desiccant was housed within the tube. The frame was used to provide a spacer. secured to peripheral portions of two glass panes (12) and (14) by means of continuous deposits (16, 18) of a polyisobutylene based adhesive composition. A secondary seal (20) was formed around the edge of the unit by extruding a curable silicone composition (A) into the "U" shaped space formed between the edges of the glass panes and the spacer. The composition was allowed to cure to provide the seal. Argon gas was introduced to the cavity (22) between the panes. The silicone composition used was formed by mixing 10 parts of a base part and 1 part of a catalyst part. The base part was formed by mixing 52 parts of a hydroxy terminated polydimethylsiloxane having a viscosity of 12,500 $mm^2$s, 47 parts of stearate coated calcium carbonate filler and 1 part of a hydroxy terminated polydimethylsiloxane having a viscosity of 40 $mm^2$s. The catalyst part was formed by mixing 2 parts of chlorosilane treated fumed silica and a catalytic amount of a dimethyl tin salt of an organic acid with 50 parts of trimethylsilyl end stopped polydimethylsiloxane having a viscosity of 350 $mm^2$ s and with the mixture obtained by reaction of 18 parts of methyl trimethoxysilane with 8 parts of glycidoxypropyl trimethoxysilane and 7 parts of γ-aminopropyl triethoxysilane at 50° C. The mixed composition cured at room temperature to an elastomeric material bonded to each of the glass surfaces. It had a tensile strength at break of more than 1.6 MPA and an elongation at break of more than 120%.

When making the illustrative unit a thermoplastic material containing desiccant was heated and applied as a hot paste at a temperature in the range of about 120° C. to about 160°

C. to the periphery of a cleaned glass pane (42) to form an endless "tape" (40) adjacent to but spaced from the extreme edge of the pane. Whilst the tape was still hot, another cleaned glass pane (44) was pressed against it. The thermoplastic material was "Naftotherm—Bu TPS" from Chemetal GmbH which is said to be a single component, thermoplastic solvent free composition based on polyisobutylene. It contained a zeolite powder desiccant. Argon gas was introduced into the cavity (48) of the unit at a slight over pressure and the panes were pressed together to squeeze the paste into a desired shape having a thickness of about 8 mm measured in a direction parallel to the plane of the glass pane and continuous contact with each glass pane over an area of 12 mm wide around the entire pane i.e. measured in a direction normal to the plane of the glass pane. The unit was allowed to cool to room temperature and the thermoplastic material allowed to harden to provide the spacer bonded to both panes. Before the cooling had been completed a layer of the curable silicone composition (A) was extruded into the "U" shaped space defined by the spacer and peripheral portions of the glass panes and allowed to cure to form a seal (46) around the edge of the unit on top of the spacer and adherent to the panes of glass. The silicone seal had a thickness of about 3–4 mm measured in a direction parallel to the plane of the glass pane and was in continuous contact with each glass pane.

Samples of units made as described above for the comparative insulating glass units and the illustrative unit were tested to determine the initial gas concentration on two units (which provides the initial gas loss rate $L_A$) then submitting other units to an aging method with cycles of high and low temperature under high humidity conditions (DIN 52293) as well as UV radiation and finally determining the gas loss rate on the aged units as a percentage of gas per annum (which provides the final gas loss rate $L_E$). The DIN 1286 Part 2 standard stipulates that both the initial ($L_A$) and the final ($L_E$) gas loss rates have to be below 1.0% per annum. If already the initial gas loss rate ($L_A$) exceeds this limit, the test is discontinued and only the initial value is reported as gas loss rate. An insulating glass unit showing a gas leakage rate of 1.0% per year following this standard test method is assumed to lose less than 5%. gas over 25 years installed in a building, and therefore will not diminish the K value for the units by more than 0.1 $W/m^2K$, which is considered as acceptable. Results of tests according to DIN 1286 part 2 on the comparative units and the illustrative units are shown in Table 1. From this Table it can be seen that the illustrative unit demonstrated a value for gas concentration of 97% and for gas loss rate (0.93 and 0.99% per annum) met the requirements of >90% and <1% respectively. These requirements are not fulfilled by the comparative unit, where the gas concentration is found to be at or above the 90% limit (90% and 91%) but the gas loss rate is above the limit of 1% per annum. (5.9 and 2.8%).

TABLE 1

| | Argon Gas Loss Rate in %/annum | Argon Gas Volume Part in % |
|---|---|---|
| Illustrative Samples | | |
| Sample 1 | 0.93 ($L_E$) | 97 |
| Sample 2 | 0.99 ($L_E$) | 97 |
| Comparative Samples | | |
| Sample 1 | 5.9 ($L_A$) | 90 |
| Sample 2 | 2.8 ($L_A$) | 91 |

There are several methods which can be used to assess if a secondary sealant is suitable for use in glazing units which will be subject to direct UV radiation such as may be encountered in structural glazing. One example is ASTM C-1184, as mentioned above. Tests carried out on silicone composition A in this way showed the cured composition to have excellent UV stability. Table 2 compares the initial values of modulus at 100% elongation (100% Modulus), elongation at break, tensile strength and failure mode to those obtained after 5000 hours of accelerated weathering (QUV ageing) obtained in accordance with ASTM 1184 test standard method. No degradation in any of the values can be observed. Rather all value improve upon weathering, with increases in modulus, tensile strength and elongation at break being observed. Furthermore, the sealant fails cohesively (CF) both initially and after the accelerated weathering. The sealant also passes the requirement of having a tensile strength of greater than 0.345 MPa after completion of the 5,000 hours accelerated ageing.

TABLE 2

| Age of sample | Physical Property | Value 8:1 | Base/Catalyst Ratio (by weight) 10:1 | 12:1 |
|---|---|---|---|---|
| Initial | 100% Modulus (MPa) | 0.87 | 0.86 | 0.81 |
| | Elongation at Break (%) | 121 | 146 | 148 |
| | Tensile Strength (MPa) | 0.93 | 0.98 | 0.94 |
| | Failure Mode | CF | CF | CF |
| After 5000 hours QUV Ageing | 100% Modulus (MPa) | 0.87 | 0.97 | 0.86 |
| | Elongation at Break (%) | 138 | 177 | 162 |
| | Tensile Strength (MPa) | 1.01 | 1.20 | 0.98 |
| | Failure Mode | CF | CF | CF |

That which is claimed is:

1. An insulating glass unit comprising two glass panes spaced apart by a spacer of thermoplastics material adherent to the panes, an inert or heavy gas trapped within the unit and a layer of silicone elastomer, where the spacer is located adjacent to but spaced from the edge portions of the panes and the layer of silicone elastomer is located between the edge portions of the glass panes and the spacer such that the layer of silicone elastomer is in contact with external surfaces of the spacer, and the spacer has been formed in place by hot application and has a water vapour permeability of not more than about 0.2 $l/m^2/day$ (measured at 20° C. for 4 mm thickness) a shear strength of more than 0.2 MPa as determined at a sealant thickness of 0.5 mm at 23° C. and a shear speed of 100 mm/min.

2. An insulating glass unit according claim 1 having an argon gas permeability of not more than 1% per year.

3. An insulating glass unit according to claim 2 in which the thermoplastics material is based on polyisobutylene.

4. An insulating glass unit according to claim 3 in which the silicone elastomer is formed by curing of a composition comprising hydroxy terminated polydiorganosiloxane and a trialkoxysilane in presence of a condensation catalyst.

5. An insulating glass unit according to claim 1 in which the thermoplastics material is based on polyisobutylene.

6. An insulating glass unit according to claim 5 in which the thermoplastics material is NAFTOTHERM BU-TPS thermoplastic as supplied at Sep. 1, 1997.

7. An insulating glass unit according to claim 1 in which the silicone elastomer is formed by curing of a composition comprising hydroxy terminated polydiorganosiloxane and a trialkoxysilane in presence of a condensation catalyst.

8. An insulating glass unit according to claim 1 in which the thermoplastics material is NAFTOTHERM BU-TPS thermoplastic as supplied at Sep. 1, 1997.

9. An insulating glass unit according to claim 8 in which the silicone elastomer is formed by curing of a composition comprising hydroxy terminated polydiorganosiloxane and a trialkoxysilane in presence of a condensation catalyst.

10. A process of making an insulating glass unit comprising the following steps carried out in any desired order (a) procuring two glass panes, (b) providing between the two glass panes an endless strip of thermoplastics material in a plastic state applied as a hot melt containing a dehydrating material, (c) urging the two glass panes towards each other against the thermoplastics material to form a spacer comprising the thermoplastics material adherent to the panes, such spacer having a water vapour permeability of not more than about 0.2 $l/m^2$/day (measured at 20° C. for 4 mm thickness) and a shear strength of more than 0.2 MPa as determined at a sealant thickness of 0.5 mm at 23° C. and a shear speed of 100 mm/min., (d) introducing to the cavity defined by the two panes and the spacer an inert or heavy gas and (e) applying a layer of silicone elastomer, where the spacer is located adjacent to but spaced from the edge portions of the panes and the layer of silicone elastomer is located between the edge portions of the glass panes and the spacer such that the layer of silicone elastomer is in contact with external surfaces of the spacer.

11. A process according to claim 10 in which the thermoplastics material is applied with a minimum average thickness of about 7 mm measured in a direction parallel to the plane of a first of the glass panes and such that it is in continuous contact with each glass pane.

12. A process according to claim 11 in which the silicone elastomer is applied with a minimum average thickness of about 3 mm measured in a direction parallel to the plane of the glass pane and such that it is in continuous contact with each glass pane.

13. A process according to claim 10 in which the glass adhesion of the silicone elastomer is of sufficient UV stability to allow use of the insulating unit in applications where the edge seal is directly exposed to sun-light.

14. A process according to claim 10 in which the silicone elastomer is applied with a minimum average thickness of about 3 mm measured in a direction parallel to the plane of the glass pane and such that it is in continuous contact with each glass pane.

* * * * *